(12) United States Patent
Guan et al.

(10) Patent No.: US 8,792,016 B2
(45) Date of Patent: Jul. 29, 2014

(54) IMAGE PROCESSING APPARATUS, IMAGE PICKUP APPARATUS, IMAGE PROCESSING METHOD, AND COMPUTER PROGRAM

(75) Inventors: Haike Guan, Tokyo (JP); Tao Li, Beijing (CN); Xun Yuan, Beijing (CN)

(73) Assignee: Ricoh Company, Limited, Tokyo (JP)

( * ) Notice: Subject to any disclaimer, the term of this patent is extended or adjusted under 35 U.S.C. 154(b) by 510 days.

(21) Appl. No.: 13/202,496

(22) PCT Filed: Jan. 19, 2010

(86) PCT No.: PCT/JP2010/050868
§ 371 (c)(1),
(2), (4) Date: Aug. 19, 2011

(87) PCT Pub. No.: WO2010/095488
PCT Pub. Date: Aug. 26, 2010

(65) Prior Publication Data
US 2011/0298946 A1    Dec. 8, 2011

(30) Foreign Application Priority Data

Feb. 20, 2009  (JP) .................................. 2009-037999
Mar. 12, 2009  (JP) .................................. 2009-059699

(51) Int. Cl.
*H04N 9/73*    (2006.01)
*G06K 9/00*    (2006.01)
*H04N 5/235*   (2006.01)
*H04N 1/60*    (2006.01)
*G06T 5/00*    (2006.01)

(52) U.S. Cl.
CPC .............. *H04N 9/735* (2013.01); *H04N 5/235* (2013.01); *H04N 5/2351* (2013.01); *H04N 1/6027* (2013.01); *G06T 5/008* (2013.01)
USPC ...................... 348/223.1; 348/225.1; 382/167

(58) Field of Classification Search
CPC .................................. H04N 9/73; H04N 9/735
USPC ......... 348/223.1, 225.1, 363, 222.1; 382/167, 382/254
See application file for complete search history.

(56) References Cited

U.S. PATENT DOCUMENTS

| 2003/0016881 | A1* | 1/2003 | Matsuura ...................... 382/274 |
| 2006/0013478 | A1* | 1/2006 | Ito et al. ........................ 382/167 |
| 2006/0132870 | A1* | 6/2006 | Kitajima ...................... 358/516 |
| 2009/0034838 | A1* | 2/2009 | Umeda et al. ................. 382/167 |

FOREIGN PATENT DOCUMENTS

| JP | 08-280041 | * | 10/1996 | ............... H04N 9/73 |
| JP | 2559000 B2 | | 11/1996 | |
| JP | 2002-281512 A | | 9/2002 | |
| JP | 2003-61103 A | | 2/2003 | |
| JP | 2003-163944 A | | 6/2003 | |
| JP | 2004-64468 A | | 2/2004 | |
| JP | 3849834 B2 | | 11/2006 | |
| JP | 2008-52428 A | | 3/2008 | |
| JP | 2009-110137 A | | 5/2009 | |

* cited by examiner

*Primary Examiner* — Nhan T Tran
(74) *Attorney, Agent, or Firm* — Dickstein Shapiro LLP

(57) ABSTRACT

An image processing apparatus that performs individual optimum image processing on each of a portion of an image illuminated by a light source and a portion of the image shaded from the light source, an image pickup apparatus, an image processing method, and a computer program are provided.

12 Claims, 11 Drawing Sheets

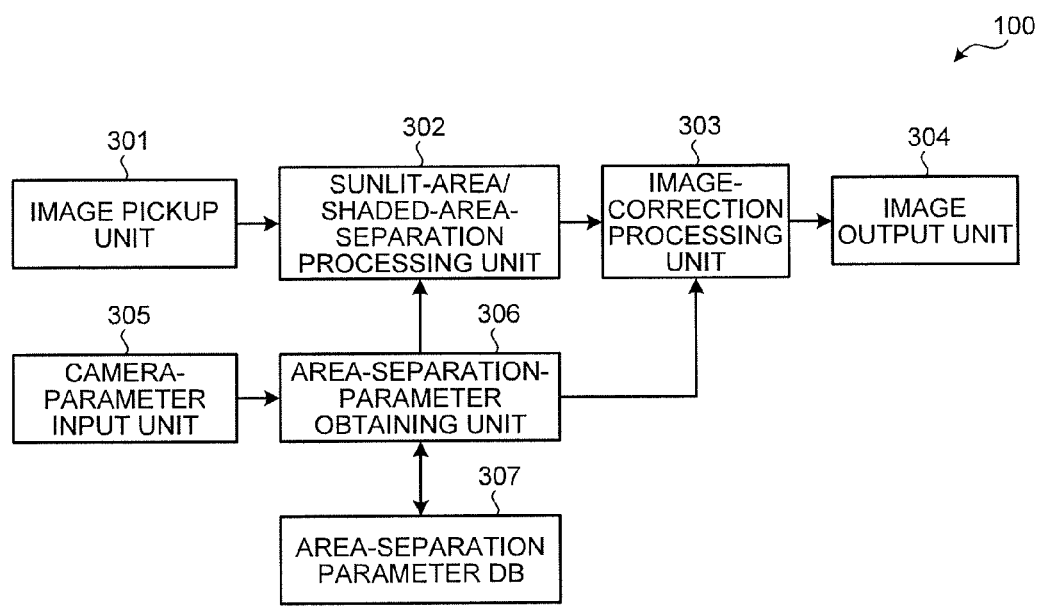

| PHOTOGRAPHING-CONDITIONS 1 | Ks1 | Y_threS1 |
| --- | --- | --- |
| PHOTOGRAPHING-CONDITIONS 2 | Ks2 | Y_threS2 |
| ... | ... | ... |
| PHOTOGRAPHING-CONDITIONS N | KsN | Y_threSN |

IMAGE PROCESSING APPARATUS, IMAGE PICKUP APPARATUS, IMAGE PROCESSING METHOD, AND COMPUTER PROGRAM

TECHNICAL FIELD

The present invention is generally directed to an image processing apparatus, an image pickup apparatus, an image processing method, and a computer program.

BACKGROUND ART

Techniques for correcting white balance of image data acquired by using an image pickup apparatus, such as a digital camera, are known in the art. White balance correction involves, for instance, changing a ratio among red (R) signals, green (G) signals, and blue (B) signals of image data.

A technique for implementing automatic white balance by identifying the type of the light source by using a photographing exposure value (EV) and correcting white balance based on the type of the light source is disclosed in Japanese Patent No. 3849834 (Patent Document 1). On the other hand, a technique for correcting white balance by identifying the type of the light source based on mean values of R, G, and B components of image data is disclosed in, for instance, Japanese Patent Application Laid-open No. 2004-64468 (Patent Document 2).

DISCLOSURE OF INVENTION

However, the methods for automatically controlling white balance disclosed in Patent Documents 1 and 2 are disadvantageous in that correction is performed uniformly on image data representing an entire screen of one image and giving no consideration to circumstances where one image may have originated from a plurality of light sources.

Assume that an image has a portion directly illuminated by a light source and a portion shaded from the light source. In this embodiment, these two portions will have different color characteristics. If white balance of such an image is corrected by assuming only one type of light source, colors in a remaining portion will become unnatural.

For example, assume that a photograph of a subject that has a sunlit area and a shaded area is taken by using an image pickup apparatus such as a digital camera. In this example, if white balance correction is performed uniformly across the entire image, is make either the sunlit area or the shaded area in the image to be unnatural in color. Assume that the sunlit area is in the background, a person is standing in the shaded area, and colors are adjusted with reference to the sunlit area. In this example, the face of the person comes out with a tinge of blue, causing the complexion to have unhealthy tone. On the other hand, if colors are adjusted with reference to the person, who is standing in the shaded area, a green forest in the background comes out with a tinge of red and has unnatural tone.

Performing white balance control uniformly across an entire screen of an image as mentioned above is disadvantageous in that, when the image has both a sunlit area and a shaded area, it is difficult to perform color reproduction optimally for both of the areas.

The present invention has been made in view of the above circumstances and it is an object of the invention to provide an image processing apparatus that performs individual optimum image processing on each of a portion of an image illuminated by a light source and a portion of the image shaded from the light source, an image pickup apparatus, an image processing method, and a computer program.

According to an aspect of the present invention, there is provided an image processing apparatus including a sunlit-area-and-shaded-area separating unit that receives an input of to-be-processed image data and separates the to-be-processed image data into a sunlit area and a shaded area based on a feature value of the to-be-processed image data; an information obtaining unit that obtains sunlit information that is information about image processing appropriate for the sunlit area and shaded information that is information about image processing appropriate for the shaded area; and an image processing unit that performs image processing on the sunlit area according to the sunlit information and/or image processing on the shaded area according to the shaded information.

As a result, it is possible to provide an image processing apparatus that performs individual optimum image processing on each of an area of an image illuminated by a light source and an area of the image shaded from the light source.

To eliminate the disadvantages, other aspects of the present invention can be implemented by way of an image pickup apparatus that includes the image processing apparatus, an image processing method to be performed by the image processing apparatus, and a computer program that causes a computer to execute the image processing method.

According to aspects of the present invention, an image processing apparatus that performs individual optimum image processing on each of a portion of an image illuminated by a light source and a portion of the image shaded from the light source, an image pickup apparatus, an image processing method, and a computer program are provided.

BRIEF DESCRIPTION OF DRAWINGS

FIG. 3 is a block diagram illustrating an exemplary functional configuration of an image pickup apparatus according to a first embodiment of the present invention.

FIG. 4 is a table for explaining an area separation parameter.

BEST MODE(S) FOR CARRYING OUT THE INVENTION

Exemplary embodiments of the present invention will be described below with reference to the accompanying drawings. In the following description, "splitting" between a sunlit area and a shaded area from each other is also referred to as "separating" the same.

A method of separating an image into a sunlit area and a shaded area according to an embodiment of the present invention will be described.

A sunlit area and a shaded area are separated from image data by using Y and a ratio B/R, where Y is a luminance value of a pixel in the image data, R is a value of a red component of the pixel, and B is a value of a blue component of the pixel. A separation criterion expressed by Y and B/R is determined for separating a sunlit area and a shaded area from each other.

More specifically, by using image data (hereinafter, "image sample") that contains information about ranges of a sunlit area and a shaded area, values for Y and R/B of each of the areas are obtained on a pixel-by-pixel basis in advance, and a separation criterion is determined based on the obtained information.

Figure 1:
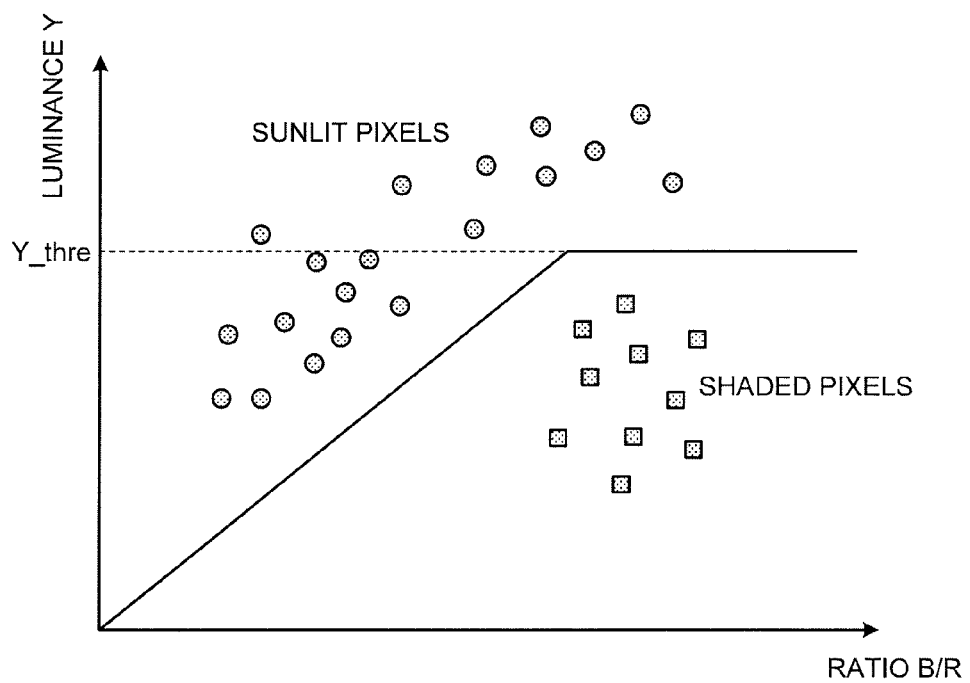
FIG. 1 is a correlation diagram between Y, which is a luminance value, and B/R, which is a ratio between a red component and a blue component.

FIG. 1 is a correlation diagram between Y, which is a luminance value, and B/R, which is a ratio between a red component and a blue component. Because an image sample has information about whether pixels therein belong to a sunlit area or to a shaded area on an individual pixel basis, the correlation diagram in FIG. 1 can be obtained by finding correlation between the luminance value Y and ratio B/R on a pixel-by-pixel basis. As shown in the correlation diagram, generally, pixels in the sunlit area and pixels in the shaded area are separated and distributed in the form of independent clusters. A criterion for separating the two clusters from each other can be obtained from this phenomenon.

A sunlit area and a shaded area can be separated from each other by using, for instance, the luminance value Y and the ratio B/R, and based on a criterion represented by Equation (1) and Equation (2) below. More specifically, when a pixel satisfies the criterion represented by both Equation (1) and Equation (2), that pixel is determined to belong to the shaded area. In these equations, K represents percent of slope of a straight-line portion and Y_thre represents a threshold value of luminance.

$$Y < K \cdot B/R \quad (1)$$

$$Y < Y\_thre \quad (2)$$

Pixels in the sunlit area and in the shaded area can be separated from each other based on the criterion represented by Equation (1) and Equation (2).

The separation criterion represented by Equation (1) and Equation (2) can vary depending on exposure, settings for automatic white balance (hereinafter, "AWB"), and the like in photographing conditions. Therefore, it is preferable to determine the separation criterion for, for instance, an image pickup apparatus on a photographing-conditions-by-photographing-conditions basis. Moreover, the threshold value, i.e., Y_thre, can vary depending on photographing conditions. Hence, one approach is to measure threshold values for a plurality of photographing conditions by performing experiment in advance to store K and Y_thre, which are the parameters, and store the measurement result in a parameter database (DB).

Figure 2:
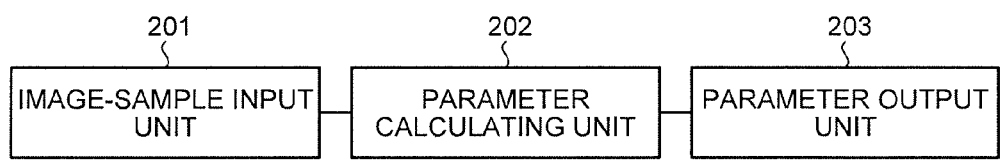
FIG. 2 is a block diagram illustrating the configuration for obtaining a parameter for separating a sunlit area and a shaded area.

FIG. 2 is a block diagram illustrating the configuration for obtaining a parameter for use in separating a sunlit area and a shaded area. The configuration illustrated in FIG. 2 includes an image-sample input unit 201, a parameter calculating unit 202, and a parameter output unit 203. The image-sample input unit 201 receives an input of an image sample. The image sample contains information about ranges of a sunlit area and a shaded area.

The parameter calculating unit 202 calculates K and Y_thre, which are the parameters, by finding the correlation mentioned with reference to FIG. 1 based on pixel values of each of the areas. The parameter output unit 203 outputs the parameters obtained by the parameter calculating unit 202.

A first embodiment will be described with reference to the drawings in which the present invention is embodied in an image pickup apparatus.

FIG. 3 is a block diagram illustrating an exemplary functional configuration of an image pickup apparatus 100 according to the first embodiment. The image pickup apparatus 100 is, for instance, a digital camera, and includes an image pickup unit 301, a sunlit-area/shaded-area-separation processing unit 302, an image-correction processing unit 303, an image output unit 304, a camera-parameter input unit 305, an area-separation-parameter obtaining unit 306, and an area-separation parameter DB 307.

The image pickup unit 301 obtains image data obtained by imaging a subject, and causes the image data to be input to the sunlit-area/shaded-area-separation processing unit 302. The image pickup unit 301 is, for instance, means that implements imaging function of the image pickup apparatus 100.

The sunlit-area/shaded-area-separation processing unit 302 performs, on the image data input from the image pickup unit 301, separation into a sunlit area and a shaded area. The separation is performed based on an area separation parameter input from the area-separation-parameter obtaining unit 306. More specifically, a pixel that satisfies the criterion represented by Equation (1) and Equation (2) is determined as a pixel in the shaded area and a pixel that does not satisfy the criterion is determined as a pixel in the sunlit area.

The camera-parameter input unit 305 obtains a photographing-conditions parameter set to the image pickup apparatus 100. The photographing-conditions parameter is also referred to as "camera parameter." The area-separation-parameter obtaining unit 306 can obtain an area separation parameter based on the photographing-conditions parameter. Area-separation parameters are preferably stored in the area-separation parameter DB 307.

FIG. 4 is a table for explaining the area separation parameters. As shown in FIG. 4, values for K (K1, K2, etc.) and Y_thre (Y_thre1, Y_thre2 etc.) are set for individual photographing-conditions parameter. The separation between the sunlit area and the shaded area is performed for each of an individual photographing-conditions parameters by substituting each set of the values for K and Y_thre into Equation (1) and Equation (2).

The image-correction processing unit 303 performs automatic white balance control appropriate for each of the thus-separated sunlit area and the shaded area. More specifically, this control is performed by obtaining an R gain, a G gain, and a B gain; i.e., a ratio among R pixels, G pixels, and B pixels, of each of the areas. The image output unit 304 outputs an image processed by the image-correction processing unit 303. The automatic white balance control can be performed based on processing parameters, each of which is appropriate for a corresponding one of the areas. The processing parameters can be, for instance, stored in the area-separation parameter DB 307 and read out by the area-separation-parameter obtaining unit 306 to be input to the image-correction processing unit 303.

Figure 5:
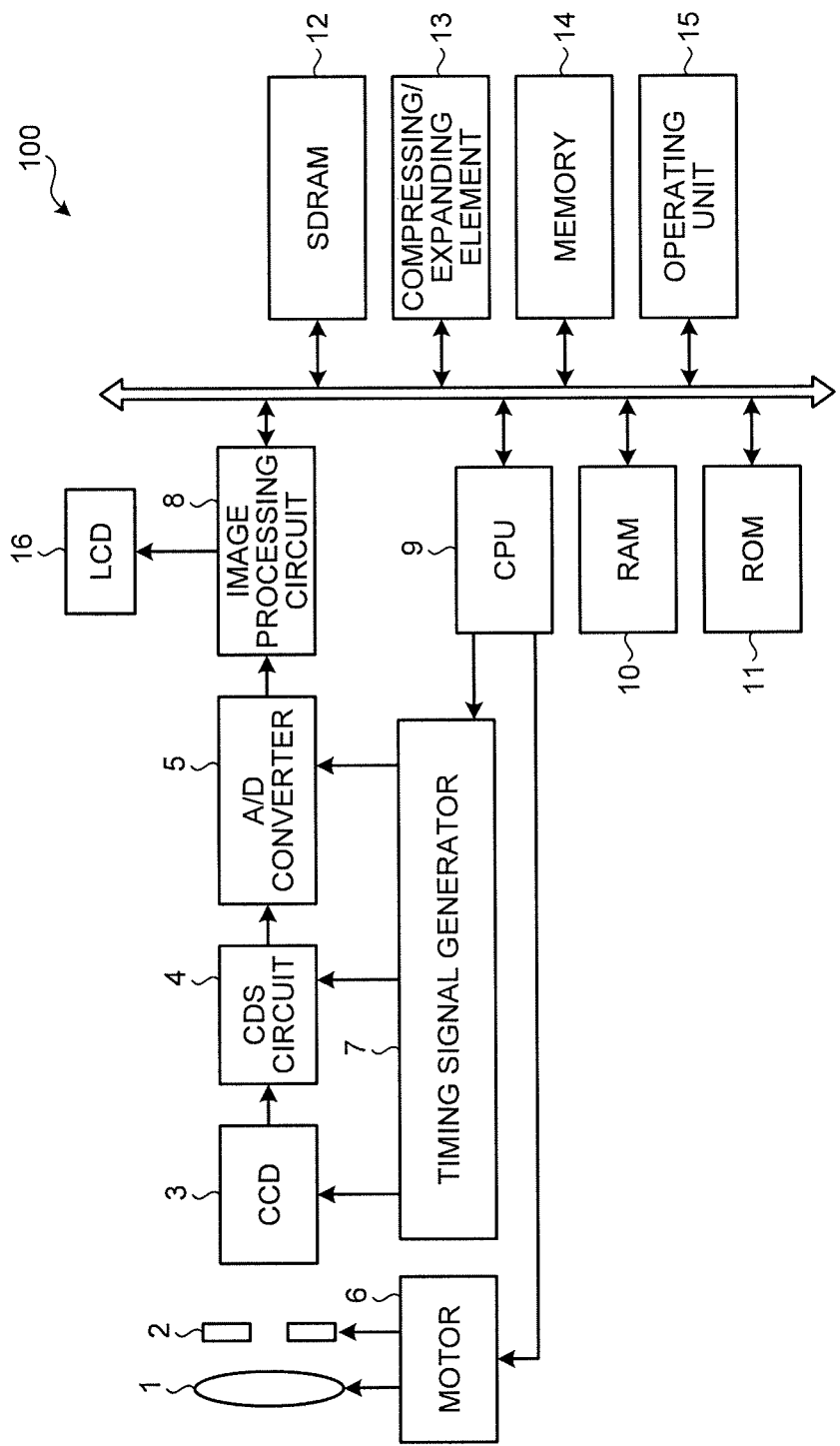
FIG. 5 is a block diagram illustrating the hardware configuration of the image pickup apparatus shown in FIG. 3.

FIG. 5 is a block diagram illustrating the hardware configuration of the image pickup apparatus 100. The image pickup apparatus 100 includes a photographing optical system 1, a mechanical shutter 2, a charge coupled device (CCD) 3, a correlated double sampling (CDS) circuit 4, an analog-to-digital (A/D) converter 5, a motor 6, a timing signal generator 7, an image processing circuit 8, a central processing unit (CPU) 9, a random access memory (RAM) 10, a read only memory (ROM) 11, a synchronous dynamic random access memory (SDRAM) 12, a compressing/expanding element 13, a memory 14, an operating unit 15, and a liquid crystal display (LCD) 16.

Light reflected fro a subject passes through the photographing optical system 1 to impinge on the COD 3. The mechanical shutter 2 arranged between the photographing optical system 1 and the CCD 3 is capable of cutting off the light incident on the CCD 3. The photographing optical system 1 and the mechanical shutter 2 are driven by the motor 6.

The CCD 3 converts an optical image formed on its imaging surface into electric signals and outputs analog image data. The image data output from the CCD 3 is subjected to noise-component removal performed by the CDS circuit 4, converted from analog data into digital data by the A/D converter 5, and then output to the image processing circuit 8.

The image processing circuit 8 performs, by using the SDRAM 12 that temporarily stores therein image data, various image processing, such as conversion from RGB signal into YCrCb signal, white balance control, contrast correction, edge enhancement, and color conversion. The white balance control is performed to adjust color density of image data. The contrast correction is performed to adjust contrast of image data. The edge enhancement is performed to adjust sharpness of image data; and the color conversion is performed to adjust hue of image data. The image processing circuit 8 displays, on the LCD 16, image data having undergone at least any one of the signal processing and image processing.

The image data having undergone the image processing performed by the image processing circuit 8 is preferably subjected to data compression performed by the compressing/expanding element 13 and thereafter stored in the memory 14. According to an instruction received from the operating unit 15, the compressing/expanding element 13 compresses image data output from the image processing circuit 8 and outputs the thus-compressed image data to the memory 14 as well as expands image data read out from the memory 14 and outputs the thus-expanded image data to the image processing circuit 8.

The CCD 3, the CDS circuit 4, and the A/D converter 5 are controlled by the CPU 9 via the timing signal generator 7 that generates timing signals. The image processing circuit 8, the compressing/expanding element 13, and the memory 14 are also controlled by the CPU 9.

In the image pickup apparatus 100, the CPU 9 performs various computations according to computer program. The image pickup apparatus 100 incorporates the ROM 11, which is a read only memory that stores therein the computer program and the like, the RAM 10, which is a readable/writable memory that includes workspace for use in various processes and various data storage areas. These are connected together via a bus line.

The image pickup apparatus 100 receives an input of the image data and temporarily stores the image data in the SDRAM 12, which is a memory area. In response thereto, sunlit-area-and-shaded-area-separation processing computer program and image-correcting computer program are read out from the ROM 11 and started to perform separation between a sunlit area and a shaded area. A parameter is read out from the area-separation parameter DB 307 stored in the ROM 11 so that the separation between the sunlit area and the shaded area is performed based on the parameter. A result of the separation between the sunlit area and the shaded area is stored in the SDRAM 12.

Figure 6:
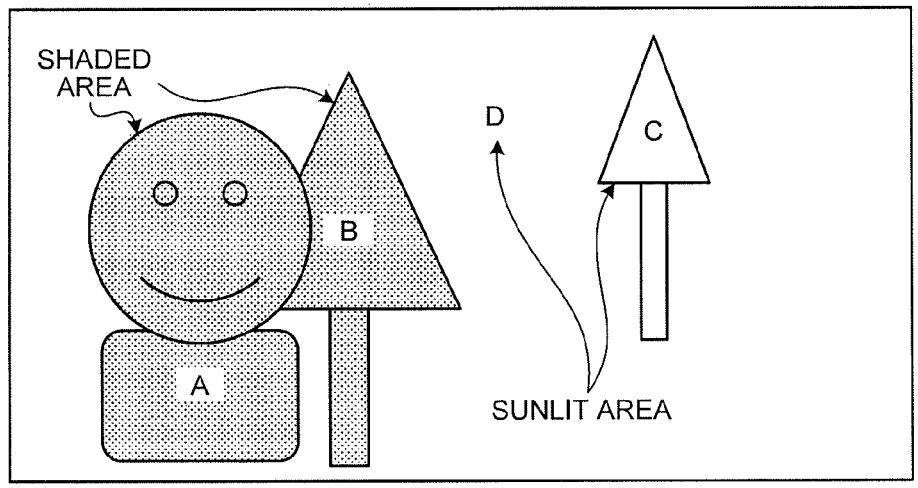
FIG. 6 is a schematic diagram illustrating a result of separation between a sunlit area and a shaded area.

FIG. 6 is a schematic diagram illustrating a result of separation between a sunlit area and a shaded area. Areas A and B belong to the shaded area while areas C and D belong to the sunlit area.

Subsequently, the image-correcting computer program is executed to perform image correction. A white portion of an image in the shaded area is searched for and located to calculate $Rg\_S$, $Gg\_S$, and $Bg\_S$, which are gains for R, G, and B in the white portion in the shaded area. Similarly, a white portion of an image in the sunlit area is searched for and located to calculate gains, or $Rg\_B$, $Gg\_B$, and $Bg\_B$. Automatic white balance control is performed based on the gains of each of the sunlit area and the shaded area.

Image-processing computer program to be executed in the image pickup apparatus 100 has a module configuration that includes a sunlit-area-and-shaded-area separating function and an image correcting function. The CPU 9 reads out the image-processing computer program from a storage medium and executes the computer program to load various units in a main storage device, by which extraction of a sunlit area and a shaded area and automatic white balance control on each of the sunlit area and the shaded area is performed. The thus-processed image data is compressed and stored in a storage area on a memory card.

An example of the process of image correction performed in the image pickup apparatus 100 will be explained below.

Figure 7:
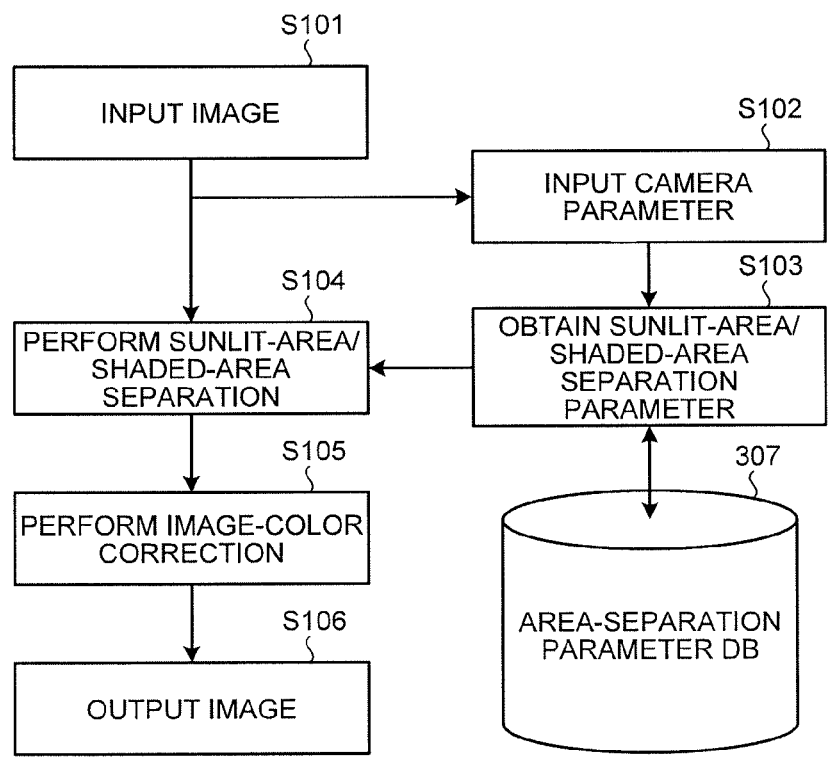
FIG. 7 is a flowchart illustrating image correction performed in the image pickup apparatus shown in FIGS. 3 and 5.

At Step S101 in FIG. 7, image data is obtained by photographing a subject with the image pickup unit 301. The system control proceeds, subsequent to Step S101, to Step S102 and Step S104.

At Step S102 that follows Step S101, a camera parameter involved in imaging performed at Step S101 is obtained. The system control proceeds, subsequent to Step S102, to Step S103 where an image-processing parameter associated with the camera parameter obtained at Step S102 is obtained. The image-processing parameter is, for instance, an area separation parameter for use in separation between a sunlit area and a shaded area, such as the values for K and Y_thre given in FIG. 4.

The image-processing parameter can include, for instance, a processing parameter to be used when image processing is performed on the image data. The image-processing parameter is preferably stored in the area-separation parameter DB 307 and read out therefrom.

At Step S104 that follows Step S101, separation between a sunlit area and a shaded area is performed. The separation is performed based on the area separation parameter obtained at Step S103 in this embodiment.

The system control proceeds, subsequent to Step S104, to Step S105 where image-color correction is performed on each of the sunlit area and the shaded area separated at Step S104 based on a processing parameter. As a result of this, appropriate automatic white balance control is performed on each of the sunlit area and the shaded area. The processing parameter can be the processing parameter read out from the area-separation parameter DB 307 at Step S103.

The system control proceeds, subsequent to Step S105, to Step S106 where image data having been processed at Step S105 is output.

A second embodiment will be described with reference to the drawings in which the present invention is embodied in an image processing apparatus. What makes the second embodiment to differ from the first embodiment will be described below.

An image processing apparatus according to the second embodiment receives an input of image data recorded by an image pickup apparatus at an image input unit in the form of a file. The thus-input image data is separated into a sunlit area and a shaded area, each of which is then subjected to individual automatic white balance control.

Figure 8:
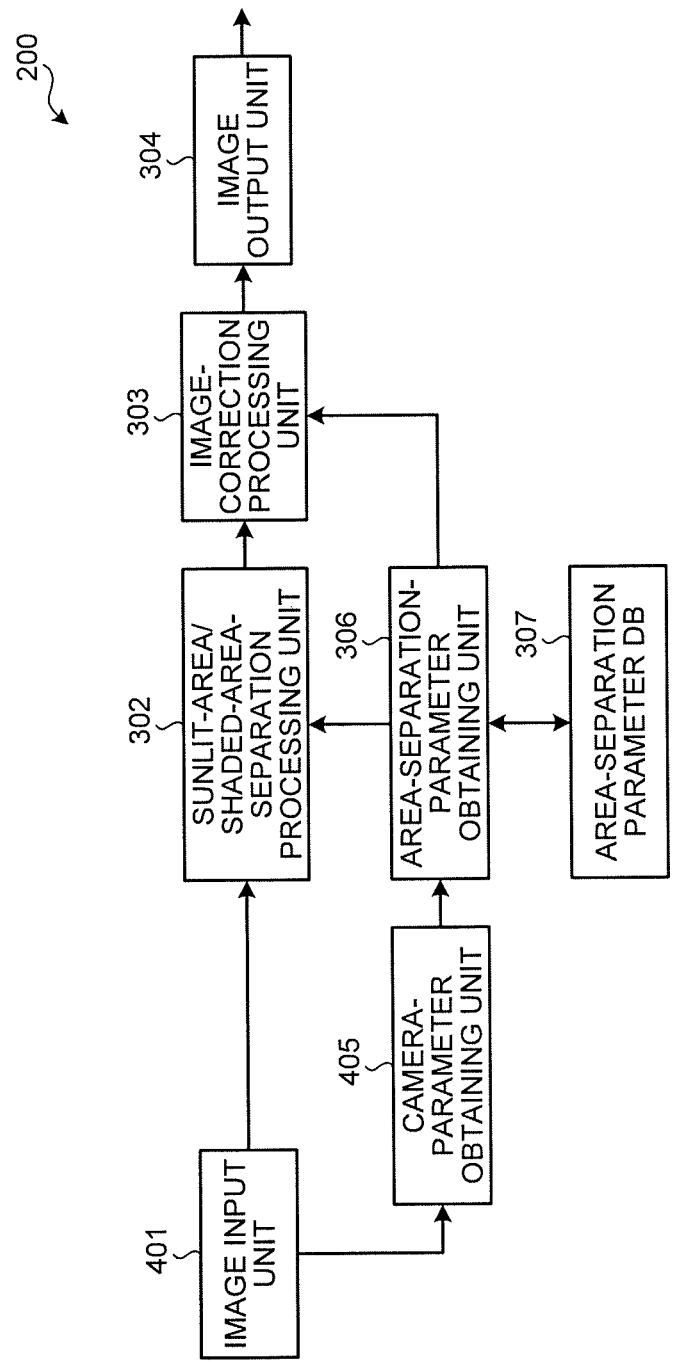
FIG. 8 is a block diagram illustrating an exemplary functional configuration of an image processing apparatus according to a second embodiment of the present invention.

FIG. 8 is a block diagram illustrating the functional configuration of an image processing apparatus 200 according to the second embodiment. With the image processing apparatus 200 depicted in FIG. 8, blocks that have the same functions and configurations as those of the image pickup apparatus 100 depicted in FIG. 3 are denoted by the same reference numerals and repeated descriptions are omitted.

The configuration of the image processing apparatus 200 depicted in FIG. 8 differs from that of the image pickup apparatus 100 depicted in FIG. 3 in an image input unit 401 and a camera-parameter obtaining unit 405. The image input unit 401 obtains image data in the form of a file (data). The image data can be, for instance, externally fed image data or image data read out from a storage device or the like (not shown).

A camera parameter is obtained by, for instance, reading Exif data from the image data.

With the image processing apparatus 200, the image-correction processing unit 303 can perform image processing only on the shaded area to implement a background blur function.

Figure 9:
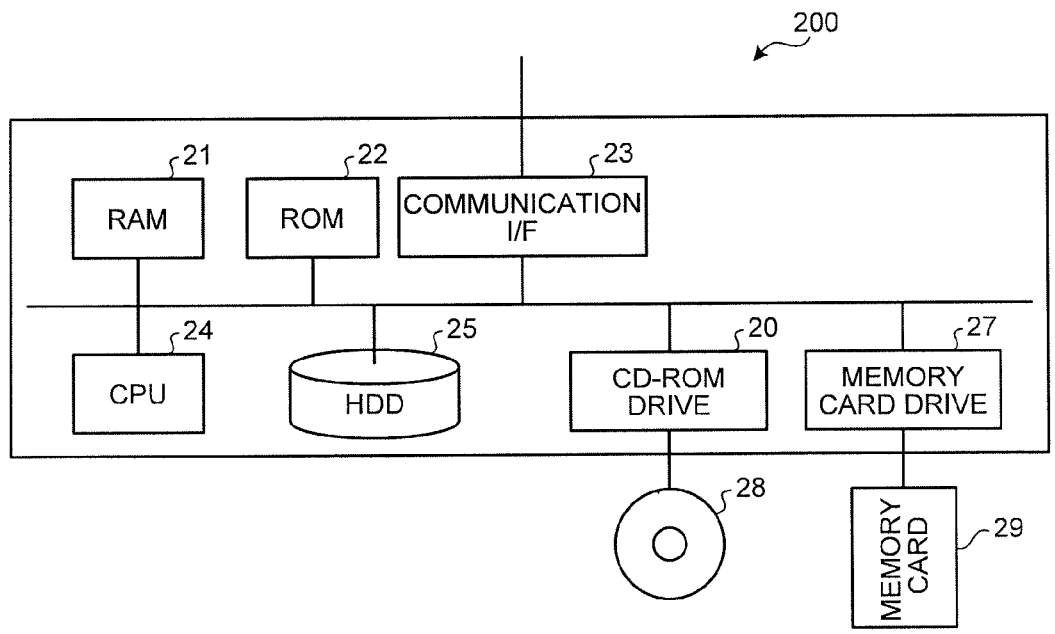
FIG. 9 is a block diagram illustrating the hardware configuration of the image processing apparatus shown in FIG. 8.

FIG. 9 is a block diagram illustrating the hardware configuration of the image processing apparatus 200. The image processing apparatus 200 includes a RAM 21, a ROM 22, a communication interface (hereinafter, "communication I/F") 23, a CPU 24, a hard disk drive (hereinafter, "HDD") 25, a compact disc (CD)-ROM drive 20, and a memory card drive 27.

The CPU 24 controls various devices provided in the image processing apparatus 200 and various devices connected to the same. To the CPU 24, the ROM 22, which is a read only memory that stores therein basic input/output system (BIOS) and the like, and the RAM 21 that rewritably stores therein various data so as to function as workspace of the CPU are connected via a bus, thereby implementing functions of a microcomputer.

To the bus, the HDD 25 that stores therein computer program, the CD-ROM drive 20 that reads a CD-ROM, and the communication I/F 23 that interfaces communications with external devices, such as a printer, are also connected.

A storage medium 28 is, for instance, a CD-ROM that stores therein computer program to be executed by the CPU 24. The CPU 24 reads the computer program stored in the storage medium 28 by using the CD-ROM drive 20 and installs the computer program in the HDD 25. The various processes, such as those mentioned above, have thus become ready to be performed. Image data and the like is stored in a memory card 29, which is to be read by using the memory card drive 27. A drive device that reads out data from another storage medium can be connected in place of the CD-ROM drive 20 and the memory card drive 27 in the present embodiment.

The storage medium is not limited to the CD-ROM or the memory card and can be another type of medium. Examples of the medium include various optical disks, such as a digital versatile disk (DVD), various magneto optical disks, various magnetic disks, such as a floppy (registered trademark) disk, and a semiconductor memory.

The computer program to be executed by the CPU 24 can be downloaded from a server apparatus connected to the image processing apparatus 200 via a network, such as the Internet, and installed in the HDD 25. With this configuration, a storage device that is connected to the server apparatus, from which the computer program is transmitted, and that stores therein the computer program is the storage medium according to the present embodiment as well.

The computer program according to the present embodiment can be computer program that operates on a predetermined operating system (OS). With this configuration, a portion of various processes, which will be described later, can be performed by the OS; alternatively, the computer program can be a portion of a set of computer program files that configure predetermined application software, such as word processing software, OS, or the like.

Functional blocks depicted in FIG. 8 are implemented by execution of the computer program according to the present embodiment by the CPU 24.

An example of the process of image correction performed by the image processing apparatus 200 is explained in detail below.

Figure 10:
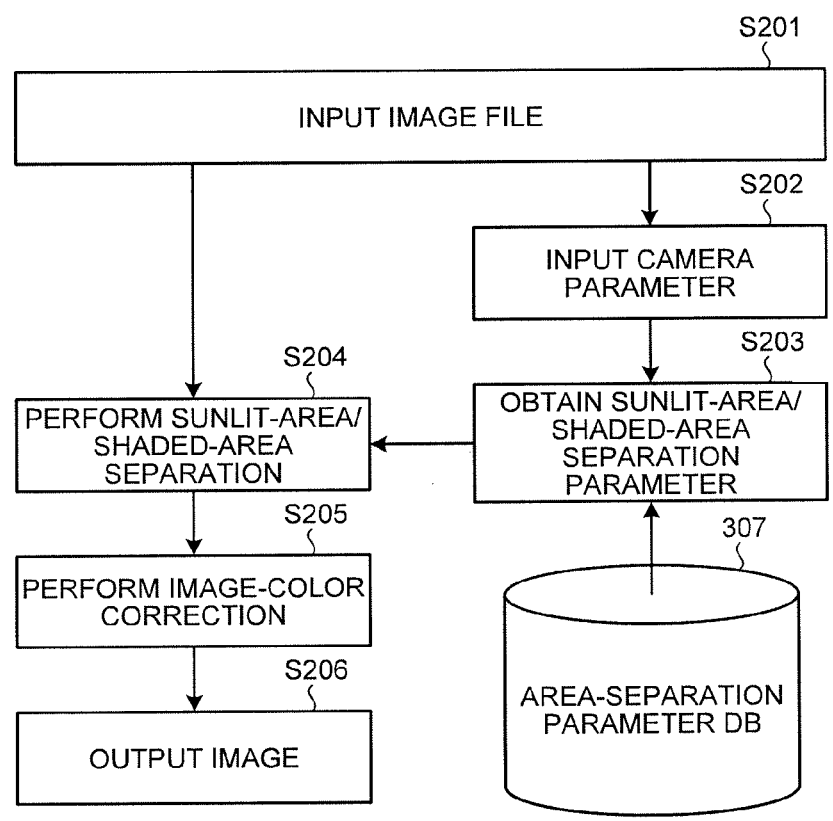
FIG. 10 is a flowchart illustrating image correction performed in the image processing apparatus shown in FIG. 8.

FIG. 10 is a flowchart illustrating image correction performed in the image processing apparatus 200. An image data file that includes a camera parameter is obtained at Step S201 of FIG. 10. The system control proceeds, subsequent to Step S201, to Step S202 and Step S204.

The system control proceeds, subsequent to Step S202, to Step S203 where an image-processing parameter associated with the camera parameter obtained at Step S202 is obtained. The system control proceeds, subsequent to Step S202, to Step S203 where an image-processing parameter associated with the camera parameter obtained at Step S202 is obtained. The image-processing parameter is, for instance, an area separation parameter for use in separation between a sunlit area and a shaded area, such as the values for K and Y_thre given in FIG. 4.

The image-processing parameter can include, for instance, a processing parameter to be used when image processing is performed on the image data. The image-processing parameter is preferably stored in the area-separation parameter DB 307 and read out therefrom.

At Step S204 that follows Step S201, separation between a sunlit area and a shaded area is performed. The separation is performed based on the area separation parameter obtained at Step S203 in this embodiment.

The system control proceeds, subsequent to Step S204, to Step S205 where image-Color correction is performed on each of the sunlit area and the shaded area separated at Step S204 based on a processing parameter. As a result of this, appropriate automatic white balance control is performed on each of the sunlit area and the shaded area. The processing parameter can be the processing parameter read out from the area-separation parameter DB 307 at Step S203.

At Step S205, background blurring can be performed in lieu of automatic white balance control. For instance, a background blur function can be implemented by performing blur processing on pixels in the shaded area. The system control proceeds, subsequent to Step S205, to Step S206 where image data having been processed at Step S205 is output.

The computer program that implements the functions of the image processing apparatus 200 can be configured to be stored in a computer connected to a network, such as the Internet, and provided by being downloaded via the network. The computer program that implements the image processing according to the present embodiment can be configured to be provided or distributed via a network, such as the Internet. The computer program according to the present embodiment can be configured to be provided by being installed in an ROM, or the like, in advance.

The computer program to be executed by the image processing apparatus 200 can be provided by being recorded in a computer-readable recording medium, such as a CD-ROM, a flexible disk (FD), a CD-R, and a DVD, as a file in an installable format or an executable format.

An exemplary file structure of image data to be processed by the image processing apparatus 200 will be described below.

Photographing conditions, under which a subject is photographed, are preferably recorded in an image data file to be processed by the image processing apparatus according to the present embodiment. Information about the photographing conditions is preferably recorded in the image data file.

In the present embodiment, a separating unit corresponds to the sunlit-area/shaded-area-separation processing unit 302, and the information obtaining unit corresponds to the area-separation-parameter obtaining unit 306.

The image processing unit corresponds to the image-correction processing unit 303, a storage unit corresponds to the area-separation parameter DB 307, and the image pickup unit corresponds to the image pickup unit 301.

When an image of a subject that has a sunlit area and a shaded area is photographed by using the image pickup apparatus 100, performing white balance control uniformly across an entire screen of the image can make either the sunlit area or the shaded area in the image to be unnatural in color in some cases. If colors are adjusted with reference to a sunlit area in a situation where, for instance, a people is in a shaded area and the background is in the sunlit area, the face of the people comes out with a tinge of blue and has unhealthy complexion. In contrast, if colors are adjusted with reference to the people in the shaded area, in a situation where, for instance, a green forest is in the background, redness of the forest is increased and has unnatural tone.

For instance, according to a technique for an image pickup apparatus disclosed in Japanese Patent Application Laid-open No. 2000-224608 (Patent Document 3), a light source type of an image is guessed based on luminance and chrominance information of the image. White balance control appropriate for the thus-guessed light source type is performed. With the image pickup apparatus disclosed in Patent Document 3, because white balance control is performed across an entire screen of the image, consideration is not given to an image that has both a sunlit area and a shaded area to perform optimum color reproduction for both of the areas.

Particularly with an image that has a blue-sky area, the blue-sky area is likely to be split as a part of a shaded area. If the blue-sky area is split to be included in a shaded area and subjected to color correction, redness of the blue-sky area disadvantageously increases.

To this end, in the present embodiment, an example of splitting a sky area that contains a blue-sky area as a part of a sunlit area will be described.

An overview of image processing according to the present embodiment for including sky area in sunlit area will be explained below.

(1) Splitting between a sunlit area and a shaded area (1A) Feature data is extracted from image data, with which information for distinguishing between a sunlit area and a shaded area is associated. Examples of the feature data include values for R, G, and G, a luminance value, and a position in an image.

(1B) A criterion for separating a sunlit area and a shaded area from each other (hereinafter, "sunlit-area-and-shaded-area separation criterion") is determined by using the feature data extracted at (1A) as learning data.

(1C) A sunlit area and a shaded area are split from each other based on the sunlit-area-and-shaded-area separation criterion.

(2) Separation of sky area (2A) Feature data is extracted from image data, with which information for distinguishing between a sky area and non-sky area is associated.

(2B) A criterion for separating a sky area and a non-sky area from each other (hereinafter, "sky-area separation criterion") is determined by using the feature data extracted at (2A) as learning data.

(2C) A sky area and a non-sky area are split from each other based on the sky-area separation criterion.

(3) An area that is identified as the sky area at (2C) and that belongs to the shaded area obtained by the splitting at (1C) is caused to be included in a sunlit area.

(4) Automatic white balance control is performed on each of the sunlit area and the shaded area.

((1) Separating sunlit area and shaded area from each other)

(1A) The sunlit area and the shaded area are split from each other in the same manner as that of the first embodiment, and repeated description is omitted.

Figure 11:
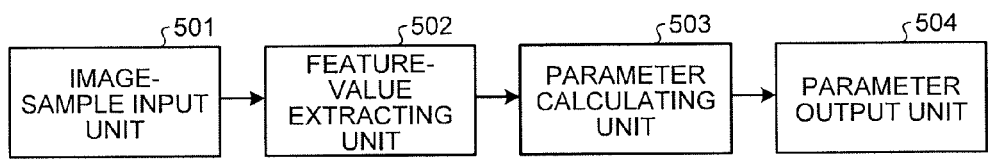
FIG. 11 is a block diagram illustrating the configuration for obtaining a parameter for use in separation between a sunlit area and a shaded area.

FIG. 11 is a block diagram illustrating the configuration for obtaining a parameter for use in separation between a sunlit area and a shaded area. The configuration illustrated in FIG. 11 includes an image-sample input unit 501, a feature-value extracting unit 502, a parameter calculating unit 503, and a parameter output unit 504.

The image-sample input unit 501 receives an input of an image sample. Information about to which one of a sunlit area and a shaded area each pixel belongs is associated with the image sample.

The feature-value extracting unit 502 extracts feature data from the image sample. The parameter calculating unit 503 calculates K and Y_thre, which are the parameters, by finding the correlation mentioned with reference to FIG. 1. The parameter output unit 504 outputs the parameters calculated by the parameter calculating unit 503.

((2) Identification of sky area)

How to identify a sky area in an image will be described below.

((2A) Feature value extraction)

A predetermined feature value is extracted from image data received as an input. Examples of the feature value include the luminance value Y and B/R, which is a ratio between an R component and a B component. Another feature value can be employed depending on characteristics of the image processing apparatus and/or characteristics of a subject. Examples of the other feature value include values for R, G, and B, a luminance value, color saturation, lightness, or a position of a pixel in an image.

((2B) Determination of sky-area separation criterion)

Figure 12:
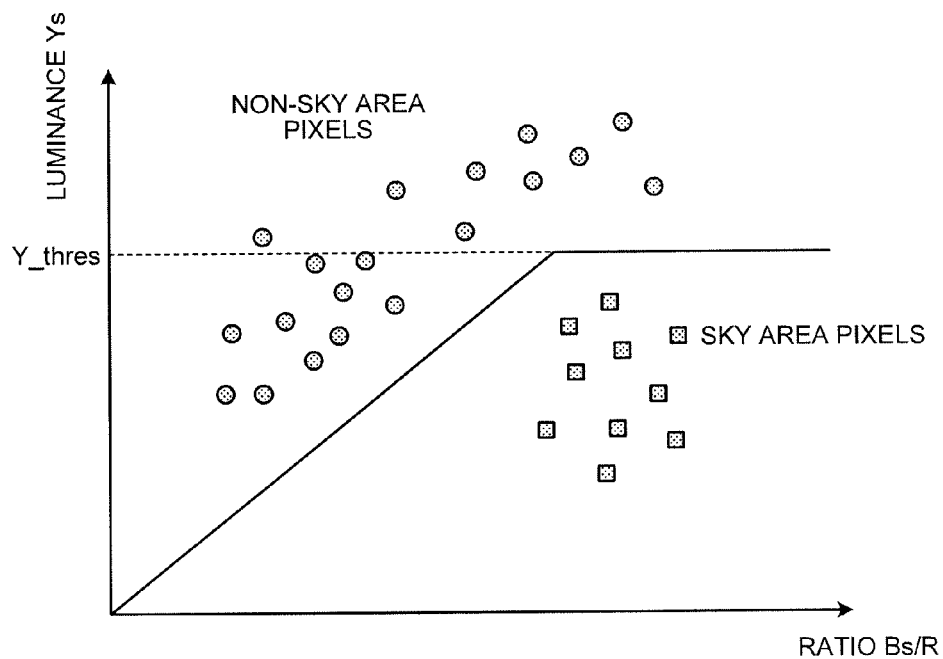
FIG. 12 is a correlation diagram between Ys, which is a luminance value, and Bs/R of each pixel in an image sample.

The sky-area separation criterion is obtained as a sky-identifying parameter. The separation criterion is determined in advance by learning with use of an image sample that contains information about a sky area. FIG. 12 is a correlation diagram between Ys, which is a luminance value, and Bs/R of pixels in an image sample. In the correlation diagram depicted in FIG. 12, the horizontal axis indicates Bs/R while the vertical axis indicates Ys. Note that a subscript "s" is appended for indication that a value appended thereby is related to a sky area.

In the correlation diagram depicted in FIG. 12, pixels that belong to the sky area and pixels that belong to the non-sky area are distributed in the form of independent clusters. Therefore, a criterion for separating the two clusters from each other can be obtained as the sky-area separation criterion. The number that represents the sky-area separation criterion is referred to as a sky-identifying parameter.

A sky area and a non-sky area can be separated from each other by, for instance, using the luminance value Ys and a value for the ratio Bs/R and based on the criterion represented by Equation (3) and Equation (4) below. More specifically, a pixel that satisfies the criterion represented by Equation (3) and Equation (4) is determined as a pixel that belongs to the sky area. In the equations, Ks, which is a percent of slope of a straight-line portion, and Y_thres, which is a threshold value of luminance, are the sky-identifying parameters.

$$Ys < Ks \cdot Bs/R \quad (3)$$

$$Ys < Y\_thres \quad (4)$$

Pixels in the sky area and those in the non-sky area can be separated from each other based on the criterion represented by Equation (3) and Equation (4).

The separation criterion represented by Equation (3) and Equation (4) can vary depending on exposure, settings of AWB, and the like in photographing conditions. Therefore, it is preferable to determine the separation criterion for, for instance, an image pickup apparatus on a photographing-conditions-by-photographing-conditions basis. The threshold value Y_thres can vary depending on photographing conditions. Hence, sky-identifying parameters for a plurality of photographing conditions can be measured by performing experiment in advance to store Ks and Y_thres, which are the parameters, in a parameter DB.

Figure 13:
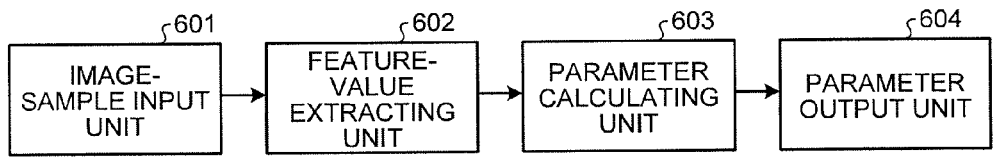
FIG. 13 is a block diagram illustrating the configuration for obtaining a parameter for use in separation of a sky area.

FIG. 13 is a block diagram illustrating the configuration for obtaining a parameter for use in separation of a sky area. The configuration illustrated in FIG. 13 includes an image-sample input unit 601, a feature-value extracting unit 602, a parameter calculating unit 603, and a parameter output unit 604.

The image-sample input unit 601 receives an input of an image sample. Information about whether each pixel belongs to a sky area is associated with the image sample.

The feature-value extracting unit 602 extracts feature data from the image sample. The parameter calculating unit 603 calculates Ks and Y_thres, which are the parameters, by finding the correlation mentioned with reference to FIG. 12. The parameter output unit 604 outputs the parameters calculated by the parameter calculating unit 603.

When two or more feature values are used to determine the sunlit-area-and-shaded-area separation criterion or the sky-area separation criterion, the separation criterion; i.e., the sky-identifying parameter, can be determined by mapping correlation between the feature values in a multidimensional space.

((2C) Splitting of sky area)

A sky area is separated from image data received as an input based on the sky separation criterion. As a result, the image data is split into the sky area and a non-sky area. More specifically, each pixel, of the thus-input image data, that is determined to belong to the sky area if a value of the pixel satisfies Equation (3) and Equation (4). In contrast, each pixel, of the thus-input image data, that is determined not to belong to the sky area if a value of the pixel does not satisfy at least any one of Equation (3) and Equation (4).

((3) Integration of result of sunlit-area/shaded-area separation and result of sky identification)

The result of the separation between the sunlit area and the shaded area and the result of the separation of the sky area are integrated together. In this example, the area separated as the sky area at (2) is included in the sunlit area.

((4) AWB performed on image having undergone separation)

By using the result of separation of the sunlit area from the shaded area, AWB control is performed on each of the sunlit area and the shaded area with a predetermined parameter.

When separation between a sunlit area and a shaded area is performed on an image that has a blue-sky area, the blue-sky area is likely to have a tinge of whitish blue as in the case of a subject in a shaded area. Therefore, the sky area is likely to be separated as the shaded area, which makes it difficult to perform appropriate processing on each of the areas after separation. With the present embodiment, appropriate processing can be performed on area-by-area basis by causing a sky area to be included in a sunlit area.

A third embodiment in which the present invention is embodied in an image processing apparatus is explained below.

Figure 14:
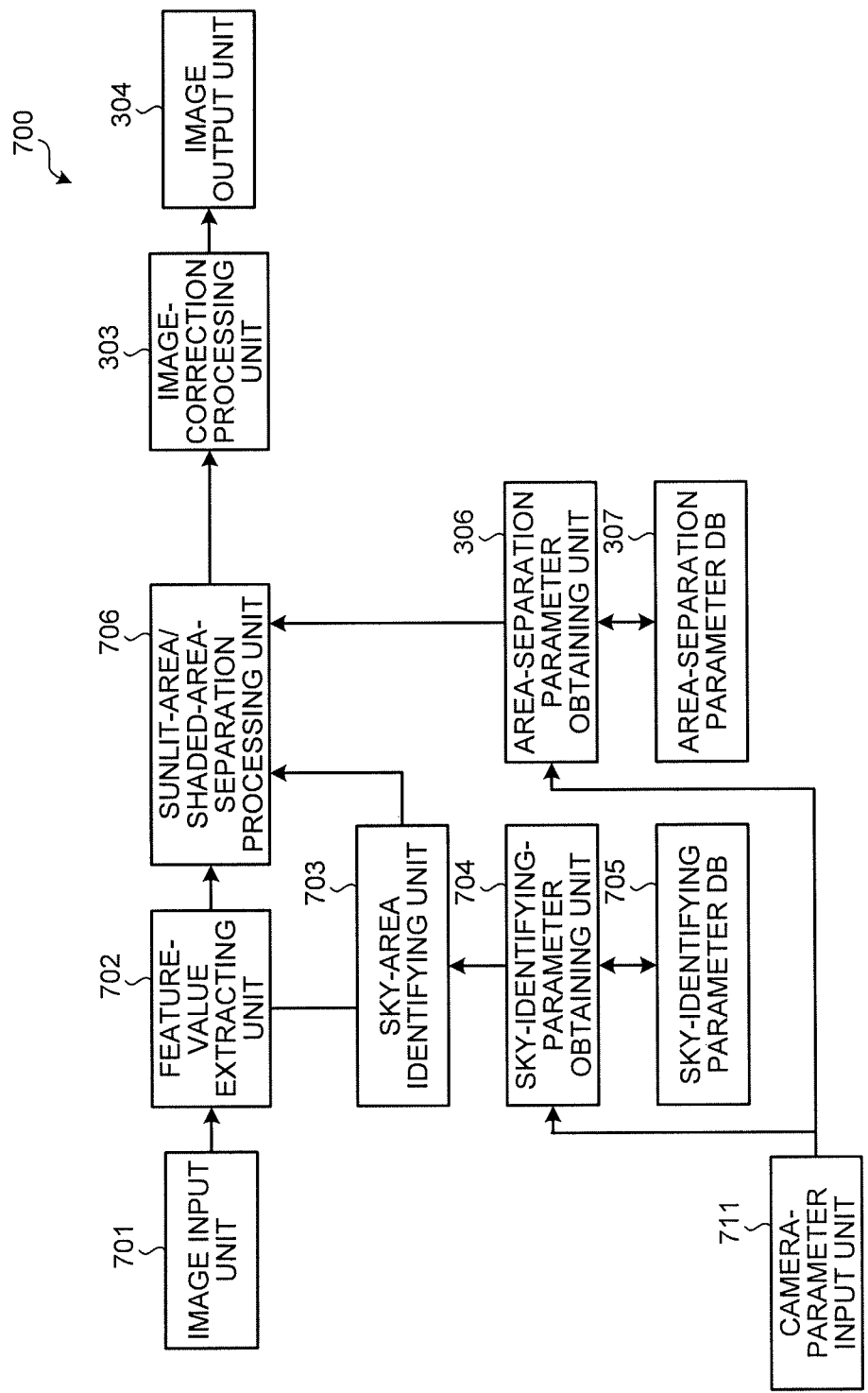
FIG. 14 is a block diagram illustrating an example of an image processing apparatus according to a third embodiment of the present invention.

FIG. 14 is a block diagram illustrating an example of an image processing apparatus 700 according to the present embodiment. The image processing apparatus 700 includes an image input unit 701, a feature-value extracting unit 702, a sky-area identifying unit 703, a sky-identifying-parameter obtaining unit 704, a sky-identifying parameter DB 705, a sunlit-area/shaded-area-separation processing unit 706, the area-separation parameter-obtaining unit 306, the area-separation parameter DB 307, the image-correction processing unit 303, the image output unit 304, and a camera-parameter input unit 711.

Units that have the same functions and configurations as those of the image pickup apparatus 100 depicted in FIG. 3 are denoted by the same reference numerals and repeated descriptions, are omitted.

The image input unit 701 receives image data. The image data is input from an image pickup apparatus, another image processing apparatus, or the like (not shown). The feature-value extracting unit 702 extracts a luminance value Y and B/R from the thus-input image data.

The sky-area identifying unit 703 separates a sky area based on feature values extracted by the feature-value extracting unit 702. The sky-area identifying unit 703 obtains a sky identifying parameter for use in separation of the sky area from the sky-identifying-parameter obtaining unit 704.

The sky-identifying-parameter obtaining unit 704 obtains, from a camera parameter input from the camera-parameter input unit 711, the sky identifying parameter for use in separation of a sky area. The camera parameter is a value that is set to an image pickup apparatus (not shown) when the image data is imaged by the pickup apparatus. Examples of items of the camera parameter include exposure, exposure time, International Standards Organization (ISO) speed, shutter speed, and aperture.

The sky-identifying-parameter obtaining unit 704 obtains a sky identifying parameter associated with the camera parameter input from the camera-parameter input unit 711. The sky identifying parameter is a parameter for use in identifying a sky area in image data. The sky-identifying-parameter obtaining unit 704 preferably generates the sky identifying parameter based on a feature value of image data that contains information for distinguishing a sky area from the other areas. The thus-generated sky identifying parameter is stored in the sky identifying parameter DB 705. The sky-identifying-parameter obtaining unit 704 outputs the sky identifying parameter stored in the sky-identifying parameter DB 705 to the sky-area identifying unit 703.

Figures 15, 16:
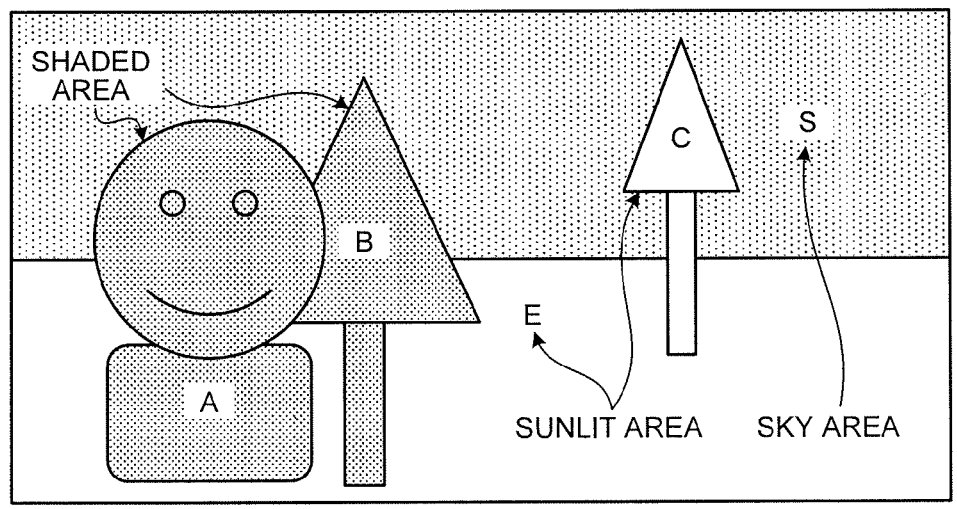
FIG. 15 is a table for explaining examples of a sky-identifying parameter.
FIG. 16 is a schematic diagram for explaining a sunlit area, a shaded area, and a sky area.

FIG. 15 is a table of examples of the sky identifying parameter for use in separation of a sky area. As shown in FIG. 15, Ks (Ks1, Ks2, etc.), which is slope, and Y_thres (Y_thres1, Y_thres2, etc.), which is an upper limit value of luminance, in the graph illustrated in FIG. 12 are set for each of different photographing conditions.

The sky identifying parameter is preferably set, for instance, as follows.

(1) For shooting in sunny outdoors, exposure time is generally short. In consideration of this, when exposure time is short, a threshold value for use in separation of the sky area is set to a value smaller than that in a situation where exposure time is long.

(2) For shooting in rainy weather, exposure time is generally long. In consideration of this, when exposure time is long, a threshold value for use in separation of the sky area is set to a value larger than that in a situation where exposure time is short.

The sky-identifying parameter DB 705 stores therein the sky identifying parameter obtained by the sky-identifying-parameter obtaining unit 704 and outputs the sky identifying parameter to the sky-identifying-parameter obtaining unit 704.

The sunlit-area/shaded-area-separation processing unit 706 receives an input of image data and performs separation between a sunlit area and a shaded area on the image data. The sunlit-area/shaded-area-separation processing unit 706 performs the separation between a sunlit area and a shaded area based on the feature values extracted by the feature-value extracting unit 702. The sunlit-area/shaded-area-separation processing unit 706 obtains an area separation parameter for use in the separation between a sunlit area and a shaded area from the area-separation-parameter obtaining unit 306.

The area separation parameter for use in the separation between a sunlit area and a shaded area is preferably obtained from, for instance, the correlation diagram depicted in FIG. 1. Descriptions about FIG. 1 and FIG. 4 have been presented in the first embodiment and repeated descriptions are omitted.

Referring to FIG. 14, the sunlit-area/shaded-area-separation processing unit 706 then causes the sky area separated by the sky-area identifying unit 703 to be included in the sunlit area. For instance, the sunlit-area/shaded-area-separation processing unit 706 can perform separation between a sunlit area and a shaded area first and then change an area that is identified as the sky area and that belongs to the shaded area to the sunlit area. This allows to prevent the sky area where "blueness" is relatively strong from being determined as belonging to the shaded area.

The hardware configuration of an image processing apparatus 700 is identical to the configuration depicted in FIG. 9. What makes the present embodiment to differ from the first embodiment will be described below.

The image processing apparatus 700 receives an input of image data and temporarily stores the image data in the SDRAM 12, which is a memory area. In response thereto, sky-area-separation-processing computer program is read out from the ROM 11 and started to perform separation of a sky area. The separation of the sky area is performed based on a parameter read out from the sky-identifying parameter DB 705 stored in the ROM 11. Information about a result of the separation of the sky area is stored in the SDRAM 12.

Sunlit-area-and-shaded-area-separation processing computer program and image-correcting computer program are read out from the ROM 11 and started to perform the separation between a sunlit area and a shaded area. The separation between a sunlit area and a shaded area is performed based on parameters read out from the area-separation parameter DB 307 stored in the ROM 11. A result of the separation between the sunlit area and the shaded area is stored in the SDRAM 12.

Image-processing computer program to be executed in the image processing apparatus 700 has a module configuration that includes a sky-area separating function, a sunlit-area-and-shaded-area separating function, and an image correcting function. The CPU 9 reads out the image-processing computer program from a storage medium and executes the computer program to load various units into a main storage device, by which extraction of a sky area, extraction of a sunlit area and a shaded area, and automatic white balance control on each of the sunlit area and the shaded area is performed. The thus-processed image data is compressed and stored in a storage area on a memory card.

FIG. 16 is a schematic diagram illustrating a sunlit area, a shaded area, and a sky area. Referring to FIG. 16, the shaded area includes areas A and B. The sunlit area includes areas C and E. The sky area includes an area S. The luminance value Y is relatively large in the sunlit area while the luminance value Y is relatively small in the shaded area. The luminance value Y in the sky area is smaller than that in the sunlit area. Accordingly, the sky area S is included in the sunlit area.

Subsequently, the image-correcting computer program is executed to perform image correction. A white portion of an image in the shaded area is searched for and located to calculate Rg_S, Gg_S, and Bg_S, which are gains for R, G, and B in the white portion in the shaded area. Similarly, a white portion of an image in the sunlit area is searched for and located to calculate gains, or Rg_B, Gg_B, and Bg_B. Automatic white balance control is performed based on the gains of each of the sunlit area and the shaded area.

Image-processing computer program to be executed in the image pickup apparatus according to the present embodiment has a module configuration that includes a sky-area separating function, a sunlit-area-and-shaded-area separating function, and an image correcting function. The CPU 9 reads out the image-processing computer program from a storage medium and executes the computer program to load various units in a main storage device, by which extraction of a sunlit area and a shaded area and automatic white balance control on each of the sunlit area and the shaded area is performed. The thus-processed image data is compressed and stored in a storage area on a memory card.

An example of the process of image correction performed in the image processing apparatus 700 is explained below.

Figure 17:
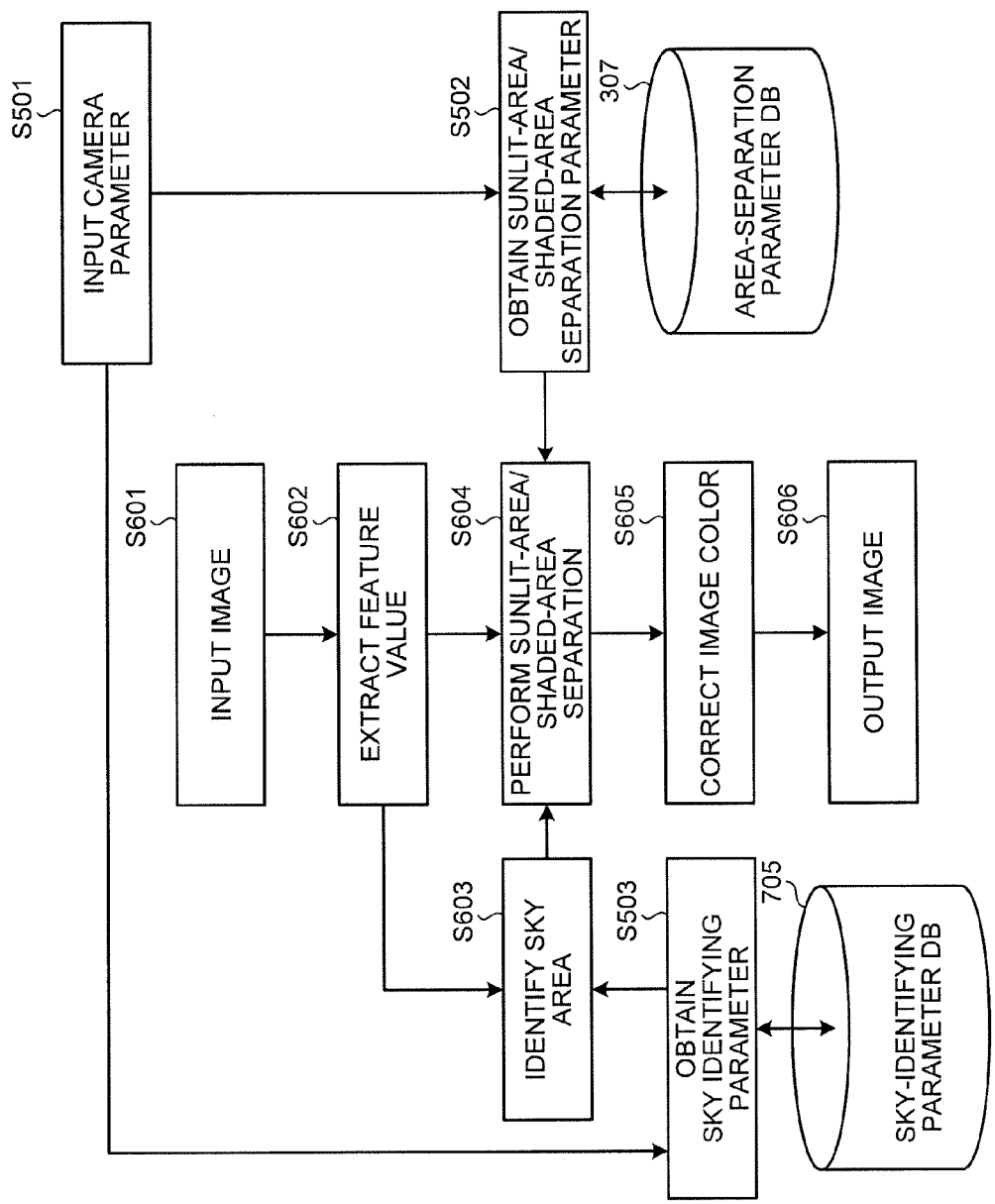
FIG. 17 is a flowchart illustrating image correction performed in the image processing apparatus shown in FIG. 14.

FIG. 17 is a flowchart illustrating image correction performed in the image processing apparatus 700. At Step S501 of FIG. 17, the camera-parameter input unit 711 obtains a camera parameter set to an image pickup unit when the image pickup unit performs imaging of a subject. The system control proceeds, subsequent to Step S501, to Step S502 and Step S503. At Step S502, the area-separation-parameter obtaining unit 306 obtains an area-splitting parameter that is associated with the camera parameter and for use in splitting a sunlit area and a shaded area from each other. At Step S503, the sky-identifying-parameter obtaining unit 704 obtains a sky identifying parameter that is associated with the camera parameter and for use in identifying a sky area.

At Step S601, image data is input from the image input unit 701. The image data is obtained by photographing performed by the image pickup unit with the camera parameter obtained at Step S501. The system control proceeds, subsequent to Step S601, to Step S602 where the feature-value extracting unit 702 extracts a feature value of the image data input at Step S601.

The system control proceeds, subsequent to Step S602, to Step S603 where a sky area is identified from the image data input at Step S601 based on the feature value extracted at Step S602 and the sky identifying parameter obtained at Step S503.

The system control proceeds, subsequent to Step S603, to Step S604 where the sunlit-area/shaded-area-separation processing unit 706 separates between a sunlit area and a shaded area in the image data input at Step S601 based on the feature value extracted at Step S602 and the area-splitting parameter that is for use in splitting a sunlit area from a shaded area and obtained at Step S502. The sunlit-area/shaded-area-separation processing unit 706 further adds the sky area to the sunlit area based on information about the sky area obtained at Step S603.

The system control proceeds, subsequent to Step S604, to Step S605 where the image-correction processing unit 303 performs processing on each of the sunlit area and the shaded area separated at Step S204 appropriate for characteristics of the area. The image-correction processing unit 303 performs, for instance, image correction such as AWB control. The system control proceeds, subsequent to Step S605, to Step S606 where the image output unit 304 outputs image data having undergone image processing performed at Step S605.

A fourth embodiment in which the present invention is embodied in an image processing apparatus is explained below.

A fourth embodiment will be described with reference to the drawings. What makes the fourth embodiment to differ from the first through third embodiments will be described below.

With an image processing apparatus according to the fourth embodiment, image data acquired by an image pickup apparatus is input to an image input unit in the form of a file. The thus-input image data is subjected to separation into a sunlit area and a shaded area, each of which is then subjected to individual automatic white balance control.

An exemplary functional configuration of the image processing apparatus according to the fourth embodiment is explained below.

An exemplary functional configuration of the image processing apparatus according to the fourth embodiment is identical with that of the image processing apparatus 700 depicted in FIG. 14.

An exemplary hardware configuration of the image processing apparatus according to the fourth embodiment is explained below.

An exemplary hardware configuration of the image processing apparatus according to the fourth embodiment is identical with that of the image processing apparatus 200 depicted in FIG. 9.

Computer program according to the fourth embodiment can be computer program that operates on a predetermined OS. With this configuration, a portion of various processes, which will be described later, can be performed by the OS; alternatively, the computer program can be a part of a set of computer program files that configures predetermined application software, such as word processing software, OS, or the like.

Functional blocks depicted in FIG. 14 are implemented by execution of this computer program by the CPU 24.

An example of the process of image correction performed by the image processing apparatus according to the fourth embodiment is explained below.

Figure 18:
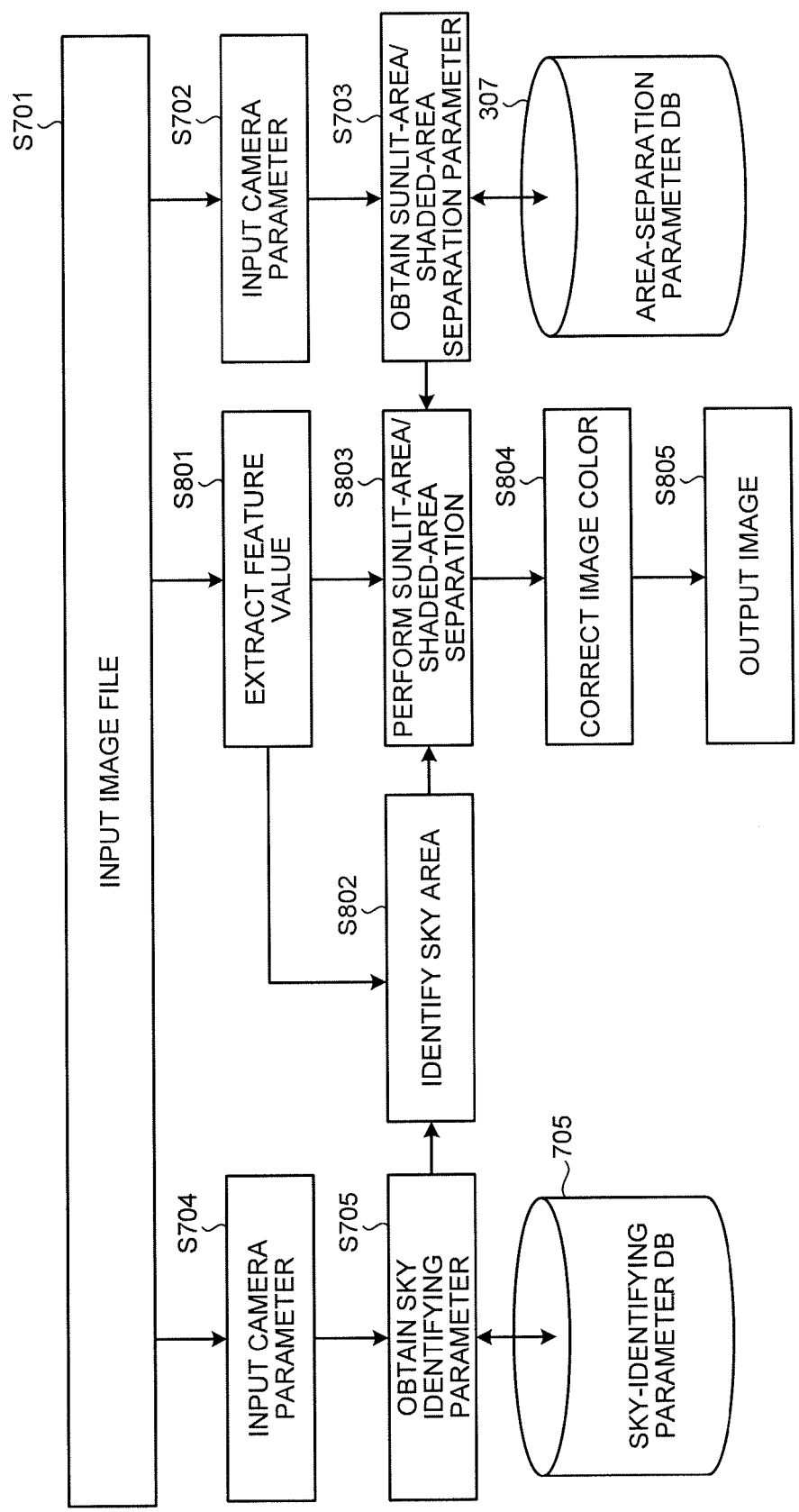
FIG. 18 is a flowchart illustrating image correction performed in the image processing apparatus shown in FIG. 14.

FIG. 18 is a flowchart illustrating image correction performed in the image processing apparatus according to the fourth embodiment. At Step S701 of FIG. 18, an image file is input from the image input unit 701. The image file is read out from, for instance, the HDD 25. Alternatively, the image file can be input from an external device (not shown) via the communication I/F 23 or the like.

The system control proceeds, subsequent to Step S701, to Step S702, Step S704, and Step S801. At Step S702, the camera-parameter input unit 711 obtains a camera parameter from the image file input at Step S701. The camera parameter is obtained by, for instance, reading Exif data from the image file.

The system control proceeds, subsequent to Step S702, to Step S703 where the area-separation-parameter obtaining unit 306 obtains an area-splitting parameter that is associated with the camera parameter obtained at Step S702 and for use in splitting a sunlit area and a shaded area from each other. The area-splitting parameter is read out from the area-separation parameter DB 307.

The same processing as that performed at Step S702 is performed at S704. Note that the system control can proceeds to, subsequent to Step S702, to Step S703 and Step S705 in place of performing processing to be performed at Step S704. The system control proceeds, subsequent to Step S704, to Step S705 where the sky-identifying-parameter obtaining unit 704 obtains a sky identifying parameter that is associated with the camera parameter obtained at Step S704 and for use in extracting a sky area. The sky identifying parameter is read out from the sky-identifying parameter DB 705.

At Step S801, a feature value of an image is extracted from the image file input at Step S701. The system control proceeds, subsequent to Step S801, to Step S802 where the sky-area identifying unit 703 separates a sky area from the image of the image file input at Step S701 based on the feature value extracted at Step S801 and the sky identifying parameter obtained at Step S705.

The system control proceeds, subsequent to Step S802, to Step S803 where the sunlit-area/shaded-area-separation processing unit 706 separates a sunlit area from a shaded area based on the feature value extracted at Step S801 and the area-splitting parameter obtained at Step S703. The sunlit-area/shaded-area-separation processing unit 706 further causes the sky area that is separated at Step S802 and that belongs to the shaded area to be included in the sunlit area.

The system control proceeds, subsequent to Step S803, to Step S804 where the image-correction processing unit 303 performs processing on each of the sunlit area and the shaded area separated at Step S803 appropriate for the area.

With the image processing apparatus according to the fourth embodiment, the image-correction processing unit 303 can perform image processing only on the shaded area to provide a background blur function.

The system control proceeds, subsequent to Step S804, to Step S805 where the image output unit 304 outputs image data having undergone image processing performed at Step S804.

The computer program that implements the functions of the image processing apparatus according to the fourth embodiment can be configured to be stored in a computer connected to a network, such as the Internet, and provided by being downloaded via the network. The computer program that implements the image processing according to the present embodiment can be configured to be provided or distributed via a network, such as the Internet. The computer program according to the present embodiment can be configured to be provided by being installed in an ROM, or the like, in advance.

The computer program to be executed by the image processing apparatus according to the present embodiment can be provided by being recorded in a computer-readable recording medium such as a CD-ROM, an FD, a CD-R, and a DVD as a file in an installable format or an executable format.

An exemplary file structure of image data to be processed by the image processing apparatus according to the fourth embodiment is explained below.

Photographing conditions, under which a subject is photographed, are preferably recorded in an image data file to be processed by the image processing apparatus according to present embodiment. Information about the photographing conditions is preferably recorded in the image data file.

Although the present invention has been described in its preferred embodiments, it is understood that the present invention is not limited thereto. It is to be understood that various changes and modifications can be made without departing from the sprint and scope of the invention.

INDUSTRIAL APPLICABILITY

As mentioned above, an image processing apparatus according to an aspect of the present invention is useful for white balance control and particularly suitable for an image pickup apparatus such as a digital camera.

The invention claimed is:

1. An image processing apparatus comprising:
 a sunlit-area-and-shaded-area separating unit that receives an input of image data and separates the image data into a sunlit area and a shaded area based on a feature value of the image data;
 an information obtaining unit that obtains sunlit information that is information about image processing appropriate for the sunlit area and shaded information that is information about image processing appropriate for the shaded area; and
 an image processing unit that performs at least one of image processing on the sunlit area according to the sunlit information and image processing on the shaded area according to the shaded information, wherein
 where a luminance value of a pixel in the image data is Y, a value of a red component of the pixel is R, a value of the blue component of the pixel is B, a first percent of slope set in advance is K, a first threshold value of luminance is Ythre, a second percent of slope used for identifying a sky area set in advance to be different from the first percent of slope is Ks, and a second threshold value of luminance used for identifying the sky area set to be different from the first threshold value is YthreS,
 the sunlit-area-and-shaded-area separating unit determines, as a pixel in the shaded area, a pixel that satisfies conditions of Y<K×B/R and Y<Ythre, and that does not satisfy conditions of Y<Ks×B/R and Y<YthreS, and the sunlit-area-and-shaded-area separating unit determines, as a pixel in the sunlit area, a pixel that is not determined to be a pixel in the shaded area.

2. The image processing apparatus according to claim 1, further comprising a separation-parameter obtaining unit that obtains the first percent of slope K and the first threshold value Ythre based on a feature value of a sunlit area of first sample image data and a feature value of a shaded area of the first sample image data, the first sample image data including area information about the sunlit area and area information about the shaded area of the first sample image data.

3. The image processing apparatus according to claim 2, wherein when the image data has been obtained by imaging performed by an image pickup unit, to which a camera parameter is set, and the image data is associated with the camera parameter, the separation-parameter obtaining unit obtains the first percent of slope K and the first threshold value Ythre based on the camera parameter.

4. The image processing apparatus according to claim 1, further comprising a sky-identifying-parameter obtaining unit that obtains, based on a feature value of a sky area of second sample image data that has area information about the sky area, the second percent of slope Ks and the second threshold value YthreS.

5. The image processing apparatus according to claim 4, wherein when the image data has been obtained by imaging performed by an image pickup unit according to a camera parameter and the image data is associated with the camera parameter, the sky-identifying-parameter obtaining unit obtains the second percent of slope Ks and the second threshold value YthreS.

6. The image processing apparatus according to claim 1, wherein the sunlit information is information for correction of color value in the sunlit area and the shaded information is information for correction of color value in the shaded area.

7. An image pickup apparatus comprising:
 the image processing apparatus according to claim 1; and
 an image pickup unit that images a subject to generate image data and inputs the image data to the image processing apparatus.

8. An image processing method comprising:
 a sunlit-area-and-shaded-area separating step of receiving an input of image data and separating the image data into a sunlit area and a shaded area based on a feature value of the image data;
 an information obtaining step of obtaining sunlit information that is information about image processing appropriate for the sunlit area and shaded information that is information about image processing appropriate for the shaded area; and
 an image processing step of performing at least one of image processing on the sunlit area according to the sunlit information and image processing on the shaded area according to the shaded information, wherein
 where a luminance value of a pixel in the image data is Y, a value of a red component of the pixel is R, a value of the blue component of the pixel is B, a first percent of slope set in advance is K, a first threshold value of luminance is Ythre, a second percent of slope used for identifying a sky area set in advance to be different from the first percent of slope is Ks, and a second threshold value of luminance used for identifying the sky area set to be different from the first threshold value is YthreS,
 the sunlit-area-and-shaded-area separating step includes determining, as a pixel in the shaded area, a pixel that satisfies conditions of Y<K×B/R and Y<Ythre, and that does not satisfy conditions of Y<Ks×B/R and Y<YthreS, and the sunlit-area-and-shaded-area separating step includes determining, as a pixel in the sunlit area, a pixel that is not determined to be a pixel in the shaded area.

9. The image processing method according to claim 8, further comprising a separation-parameter obtaining step of obtaining the first percent of slope K and the first threshold value Ythre based on a feature value of a sunlit area of first sample image data and a feature value of a shaded area of the first sample image data, the first sample image data including area information about the sunlit area and area information about the shaded area of the first sample image data.

10. The image processing method according to claim 8, further comprising a sky-identifying-parameter obtaining step of obtaining, based on a feature value of a sky area of second sample image data that has area information about the sky area, the second percent of slope Ks and the second threshold value YthreS.

11. The image processing method according to claim 8, wherein the sunlit information is information for correction of color value in the sunlit area and the shaded information is information for correction of color value in the shaded area.

12. A computer program having a non-transitory computer readable medium including programmed instructions for causing, when executed by a computer, the computer to perform the image processing method according to claim 8.

* * * * *